INVENTORS
Fred W. Hottenroth
Richard C. Spooner

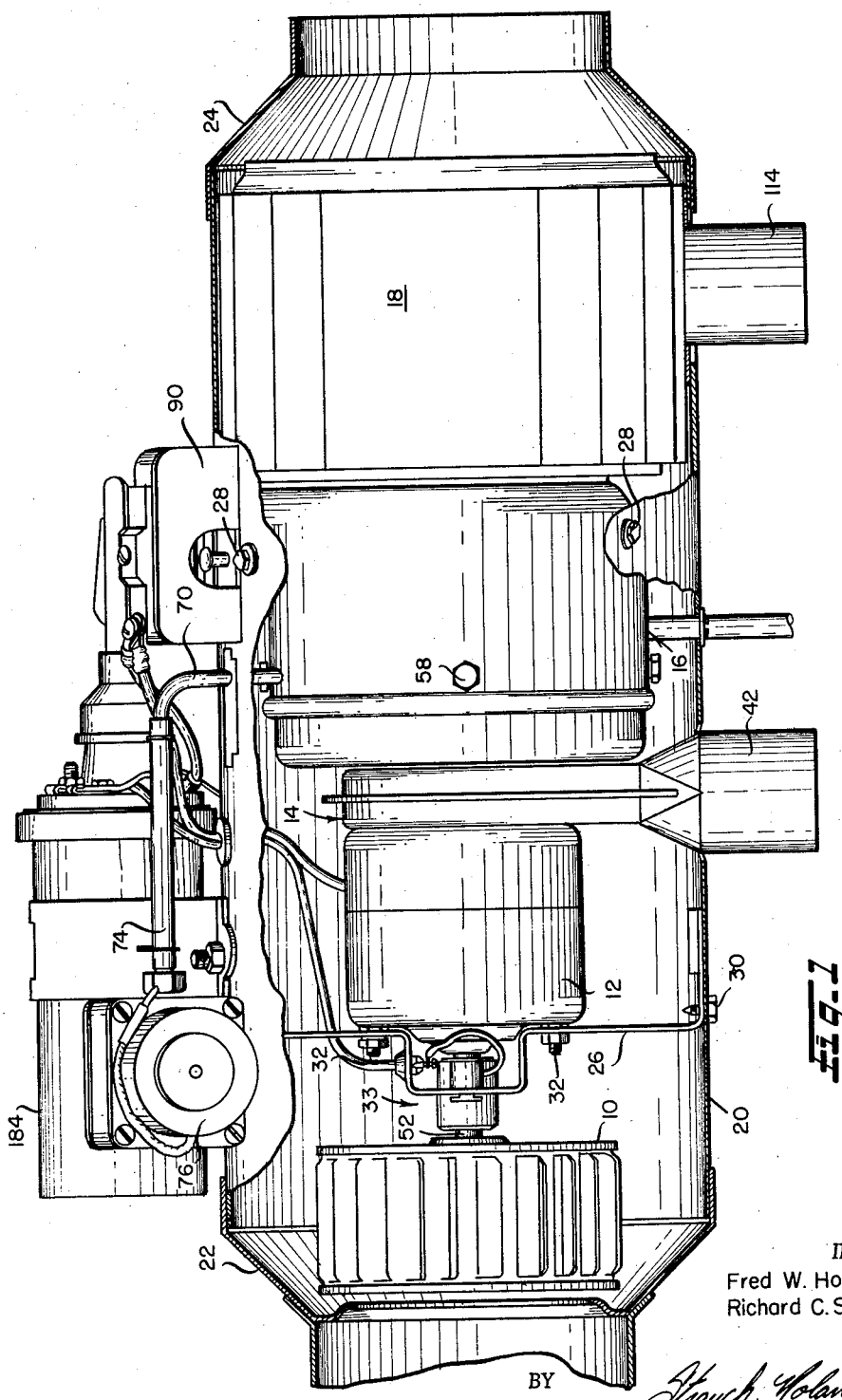

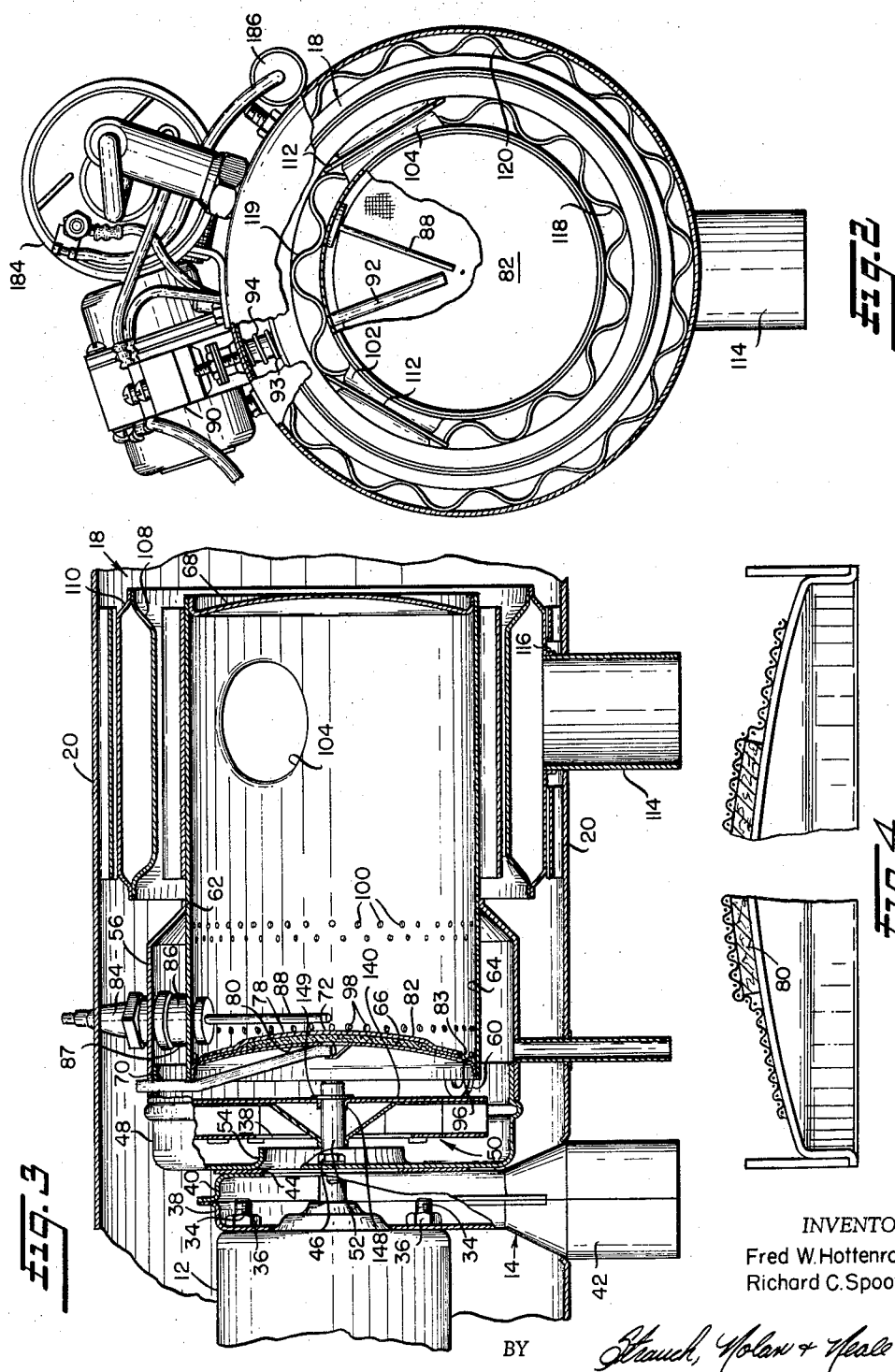

United States Patent Office 3,144,862
Patented Aug. 18, 1964

3,144,862
FUEL BURNING HEATERS
Fred W. Hottenroth, Cleveland Heights, and Richard C. Spooner, Fairview Park, Ohio, assignors to Hupp Corporation, Cleveland, Ohio, a corporation of Virginia
Filed Sept. 7, 1960, Ser. No. 54,402
3 Claims. (Cl. 126—110)

This invention relates to heating apparatus and more particularly to liquid fuel fired heaters which deliver a stream of heated fresh air and to components for such heaters. Heaters of this type are particularly useful in supplying heated air to the interior of a vehicle, especially a passenger car.

The increasing popularity of automobiles using air cooled engines has given rise to a need for a gasoline fired automotive heater which supplies heat independently of the main vehicle engine. While heaters have been offered for this purpose for many years, they have not been wholly satisfactory and have consistently failed to meet the exacting requirements of safety, reliability and economy of operation established by the automotive industry and the motoring public.

It is the primary purpose and object of the present invention to provde improved heaters, components and control systems which satisfy these requirements to a degree not heretofore possible.

In attaining this and other objects, the heaters of the present invention comprise a compact unit of relatively few parts in which the fresh air and combustion air circuits are completely isolated from each other but in which only one motor is utilized to drive separate blowers for the two air circuits. The air circuits are so arranged that in the unlikely event of rupture of any of the walls separating them, leakage from the combustion chamber into the fresh air circuit is eliminated or significantly reduced.

The heaters of the present invention also provide a combined combustion chamber-burner of unique construction, an associated fuel and air supply apparatus and an ignition system which cooperate to assure instant starting and efficient operation even under the most adverse conditions. The efficiency of the combustion is reflected not only in reduced fuel consumption but also in decreased maintenance costs since it is not necessary to disassemble the burner for periodic cleaning as is common in prior heaters of this general type.

The novel ignition system of the present invention includes a novel spark generator, one electrode of which has an unusually large surface area thus eliminating the need for cleaning and gapping the spark plug or similar unit of prior devices.

It is a further object of the present invention to provide an improved wick structure for the burner which affords improved fuel distribution and has an extended trouble-free service life and eliminates the possibility of clogging commonly associated with the nozzles used in prior systems.

It is a further object of the present invention to provide improved combustion apparatus effective to achieve clean, efficient combustion over extraordinarily wide ranges of fuel-air ratios and which is thus ideally suited for automotive use since its efficiency is independent of the variation in blower speed or fuel pressure which may be caused in normal operation of automotive vehicles.

It is an additional object of the present invention to provide improved automotive heaters capable of intermittent operation on a relatively rapid cycle without the danger of explosive combustion.

Additional objects and advantages will become apparent as the description proceeds in connection with the accompanying drawings in which:

FIGURE 1 is a side elevation of the heater of the present invention with parts broken away to show interior details of construction;

FIGURE 2 is an end view of the heater of FIGURE 1 again with parts broken away to show constructional details;

FIGURE 3 is a vertical section of a combustion chamber-burner-heat exchanger sub-assembly of the heater of the present invention;

FIGURE 4 is an enlarged fragmentary view of the wick assembly; and

Figure 5:
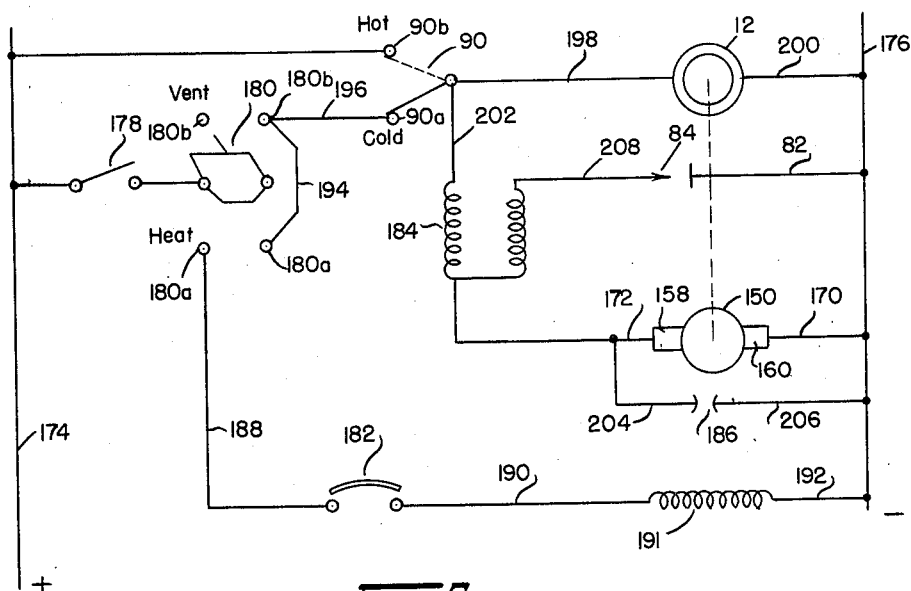
FIGURE 5 is a circuit diagram of the control and ignition system for the heater of the present invention.

Referring now more particularly to the drawings, the principal components of the heater including the fresh air blower 10, the drive motor 12, the combustion air duct assembly 14, the combined combustion chamber-burner assembly indicated generally at 16 and the heat exchanger assembly indicated generally at 18 are mounted in coaxial relation within a tubular casing member 20. The cold fresh air is drawn into the casing 20 through an inlet cover 22 and the heated fresh air is delivered from the unit through the outlet cover 24. Each of these covers may take a number of forms depending upon the conduit system with which the heater is associated.

The internal components, all of which are secured together as described in detail below to form a unitary subassembly, are mounted in the housing 20 in coaxial relation therewith by a bracket 26 and by five studs 28 (two shown) which extend through the housing member 20 and are threaded into nuts welded to the interior of the housing of the burner-combustion chamber 16. The bracket 26 which is secured at its opposite ends to the housing 20 by screws 30 and to the motor by the usual motor mount studs 32, also supports and encloses the novel ignition circuit interrupter assembly 33. At its opposite end the motor is secured by studs 34 and nuts 36 to the combustion air duct assembly 14 which comprises two identical half stampings 38 and 40 welded together to form a structure which is air-tight except for the integral side inlet conduit 42 and a central outlet opening 44.

The combustion air duct assembly 14 is secured by a plurality of stud and nut assemblies 46 to the bottom of a cup member 48 which surrounds the combustion air blower assembly indicated generally at 50 described in detail below. The blower 50 is removably mounted on the end of the motor shaft 52 which extends through the aligned openings 44 and 54 in the combustion air duct and the cup 48, respectively. Suitable sealing gaskets are provided between the combustion air duct 14 and the motor and between the duct assembly and the cup 48 to provide an air-tight structure when the units are assembled.

The larger end of an annular combustion chamber housing member 56 is positioned with a close sliding fit over the outer surface of the cup member 48 and the parts are secured together by a plurality of cap screws 58 threaded into nuts 60 welded to the interior of the cup member 48. The smaller end of the housing member 56 is welded as at 62 to the outer surface of a cylindrical combustion chamber-burner member 64, the opposite ends of which are closed by end plates 66 and 68 peripherally welded to the inner surface of the member 64.

Fuel is supplied to the burner through a supply tube 70 the end of which is welded to a cup 72 struck from the central portion of the end plate 66. The fuel conduit extends to the exterior of the device through aligned openings in the cap 48, the housing member 56 and the main housing member 20 and is connected through a flexible section 74 to the outlet side of a combined pressure relief and shut-off valve 76 suitably mounted on the exterior of the housing member 20. Fuel supplied under pressure to the inlet side of the valve 76 from the normal engine fuel pump through a conduit (not shown) is delivered through the conduit 70 to the center of a fuel distribution or wick assembly indicated generally at 78 which comprises a layer 80 of felted ceramic sold by the Carborundum Company under the trademark "FIBREFRAX." The layer 80 of the felted ceramic material which is of generally circular form is held in place by a circular wire screen 82 fabricated from heat resistant metal. The marginal edges of the screen 82 are welded as at 83 to the end cover plate 66 to form a permanent installation. The characteristics of the felted ceramic layer 80 are such that the fuel supplied to it is immediately distributed substantially uniformly over its entire area, thus providing a vaporization surface which comprises substantially the entire area of the end of the combustion chamber. Since it is fabricated from ceramic material, its service life is as long as that of the metal components of the heater.

Ignition is effected by spark plug 84 mounted in a collar 86 brazed to the members 56 and 64. The collar 86 is provided with vent openings 87 to keep the plug 84 clean. The spark plug 84 is provided with an electrode 88 which terminates closely adjacent the center of the screen 82 to form a spark gap at this point, the screen 82 which is grounded providing the negative electrode. Since the entire screen 82 forms the electrode, the required spark gap will be maintained even if the electrode 88 and the screen 82 have deteriorated after extended service. Thus the annoying problems associated with the cleaning and gapping the spark plugs employed in prior units are entirely eliminated.

A flame switch assembly 90 is mounted on the outer surface of the main housing member 20 and is provided with a probe 92 which extends through aligned openings in the members 56 and 64 toward the center of the combustion chamber. The area around the flame switch is closed by a seal member 93 held in place by a spring 94. The function of the flame switch will be described in detail below.

Combustion air is supplied to the burner through three sets of openings 96, 98 and 100 formed on the wall of the combustion chamber 64. The size and spacing of these openings is such that they provide a progressively increasing air supply from left to right as viewed in FIGURE 3. It has been found that the rear holes 96 prevent carbon formation on the rear of the burner but do not extinguish the starting flame. While critical limits of the spacing and size of the openings have not been determined, it has been found that openings having the following dimensions and locations effect clean, efficient combustion with fuels having a wide range of viscosity and over extremely wide ranges of fuel-air ratio:

Holes 96 comprise 8 equally spaced openings .098 inch in diameter, each spaced .406 inch from the rear end of the burner.

Holes 98 comprise 24 equally spaced holes of .098 inch in diameter spaced .656 inch from the rear end of the burner.

Holes 100 comprise 80 equally spaced holes of .098 inch in diameter, one row of holes being 1.843 inches from the back end of the burner and the other row of holes being spaced 1.968 inches from the rear end of the burner.

The combustion gases pass from the interior of the combustion chamber 64 through passages 102 and 104 into the interior of the heat exchanger assembly indicated generally at 13 which includes an annulus formed by inner and outer members 108 and 110 welded together at their opposite ends to form a sealed unit. The passages 102 and 104 are formed by bosses struck from the combustion tube 64 and the inner heat exchange member 108, the bosses being welded to spacer rings 112. The combustion gases exit from the heat exchanger through a conduit 114 welded to the outer heat exchange member 110 as at 116, the conduit 114 extending outwardly through the main housing member 20 for connection to a conduit for disposition of the exhaust gases as desired.

The heat exchanger assembly also comprises sinuous strips 118, 119 and 120, the strips 118 and 119 being positioned between the members 64 and 108 and the strip 120 being positioned between the members 110 and 20. These heat exchange strips are held in place solely by friction due to their inherent resilience, thus eliminating the need for relatively expensive welding.

The commutator slip ring brush assembly 33 which is employed in the spark generation circuit comprises a rotor 150 having discontinuous and continuous surface areas engaged by brushes 158 and 160 respectively. A lead 170 connects the brush 160 to ground through the bracket 26 and a lead 172 connects the brush 158 to the positive side of the circuit as is best understood by reference to the circuit of FIGURE 5.

In FIGURE 5 the main power leads connected to the usual automotive 12 volt battery are indicated at 174 and 176, the former being connected to the positive terminal and the latter being connected to ground. The principal components of the electrical system in addition to those previously described are the main vehicle ignition switch 178, a double pole-double throw switch 180 preferably located on the dashboard of the vehicle, a thermostat 182 which may be positioned at any convenient location, for example in the interior of the car or in the stream of heated air issuing from the heater, the ignition coil 184 mounted on the casing or main housing member 20 of the burner as shown in FIGURES 1 and 2, and the condenser 186 also mounted on the heater housing member 20.

At any time when the heater is cool, the flame switch will be in the position shown in full lines in FIGURE 5 establishing a closed circuit through the cold cointact 90a. When the probe 92 of the switch 90 is heated, the contact 90b will be closed as shown by the dotted line.

First let it be assumed that both the interior of the vehicle and the heater are cold and that the vehicle is in operation with the ignition switch 178 closed. The heater then may be put into operation by moving the switch 180 to close the contact 180a. This action will close the circuit through lead 188 through closed thermostat 182, lead 190, and a solenoid 191 of the fuel shut-off valve 76 which is connected to ground through lead 192, thus permitting fuel to flow through the conduit 70 to the combustion chamber. Simultaneouslby a circuit including leads 194, 196, contact 90a of switch 90 and leads 198 and 200 will energize the blower motor 12 which drives the fresh air blower 10, the combustion air blower 50 and the rotor 150. At the same time current will be caused to flow through lead 202, the primary winding of the coil 184 and through the lead 172 to the circuit interrupter 150. In accordance with conventional practice, condenser 186 is connected in parallel with the circuit interrupter 150 through leads 204 and 206. The spark plug 84 is connected to the secondary winding of the coil through lead 208.

The make and break action of the slip ring-commutator 150 generates a substantially continuous spark between the electrode 88 and the wire screen 82 which substantially instantaneously initiates combustion in the heater unit. After normal combustion has been established for a brief period, for example 30 seconds, the probe 92 of the flame switch will become sufficiently heated to open the circuit through contact 90a and close the circuit through contact 90b thereby by-passing the heater switch 180 and the ignition switch 178.

In normal operation combustion will continue until the temperature of the vehicle rises sufficiently to open thermostat 182 thus de-energizing the solenoid 191 of valve 76 and discontinuing the flow of fuel. However the blower motor 12 and the ignition circuit remain energized to assume completion of combustion of any fuel remaining in the combustion chamber. When the combustion of this residual fuel has been completed, the flame switch 90 will become cooled and the circuit through the contact 90b will be opened, the circuit through the contact 90a will be closed thus continuing operation of the blower motor 12 and the ignition system. When the thermostat 182 is again closed due to a decrease in the ambient temperature, the above described cycle will be repeated.

It will be noted that when the heater is in operation and either the heater switch 180 is open or the ignition switch 178 is open, only the solenoid for the fuel valve will be de-energized and combustion will continue until the unit is thoroughly purged at which time the flame switch will open the circuit through contact 90b thus de-energizing the entire system.

The alternate contact 180b is provided in the heater switch 180 to permit operation of the blower 12 to supply unheated fresh air when desired for summertime ventilation.

It is to be particularly noted that in the electrical systems of the present invention both wear or the effects of wear are significantly reduced. Actual experience has shown that all of the components of this system have a service life at least as long as that of the electrical motor 12. Thus the need for frequent maintenance and adjustment or replacement of parts commonly associated with prior units of this type is entirely eliminated.

As stated above, when fuel is supplied to the felted ceramic wick 80 when the solenoid 191 is energized, the fuel is distributed substantially instantaneously over the entire surface area of the wick. The fuel is vaporized by the air supplied through holes 96, 98 and 100 which carries the fuel-air mixture in a helical path axially of the combustion tube 64 and combustion is initiated at the center of the wick by the electrode 88. Because of the cooperation of the wick and the size and disposition of the air holes and the introduction of the air in a helical pattern, combustion is effected with an extraordinarily high efficiency despite wide variations in the fuel-air ratio. The efficiency of this combustion also keeps the combustion chamber completely clean, an effect which is promoted by the scrubbing action exerted on the inner wall of the chamber 64 by the rotary motion of the gas within it.

Since the fresh air blower 10 is positioned at the inlet of the fresh air circuit, it positively directs cooling air over the motor 12 and more important establishes a pressure in the area surrounding the combustion chamber which is at least as high as that existing within the combustion chamber. Accordingly, if a leak should develop in the combustion apparatus, there will be no marked tendency for the products of combustion to enter the fresh air circuit. In many prior units the fresh air blower is located at the outlet end of the unit and sucks or pulls fresh air through the unit thus establishing an area of slightly reduced pressure surrounding the combustion chamber with a result that in the event of leakage, large quantities of the combustion products flow into the fresh air circuit with results which may be disastrous.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Fluid fuel burning apparatus comprising means forming a combustion chamber having a substantially cylindrical wall, a first end plate closing one end of said chamber, an imperforate second end plate closing the other end of said chamber, a thin substantially flat ceramic wick in surface contact with at least the central portion of the inner surface of said second end plate, a fluid fuel inlet communicating with said central portion of said second end plate, an electrically conductive foraminous retainer for said wick rigid with said second end plate, a spark plug having an electrode terminating at a point closely adjacent said conductive retainer to form a spark gap therewith, an annular combustion chamber housing member surrounding a portion of said combustion chamber adjacent said second end plate, means for moving air in a helical path in the space between said combustion chamber and said combustion chamber housing member, means forming air inlet openings in the wall of said combustion chamber adjacent said wick, said openings communicating with said space whereby air is caused to flow through said openings into said combustion chamber in a helical flow path, and passage means leading through said cylindrical wall of said combustion chamber forming a path for combustion products to the exterior of said combustion chamber.

2. Fluid fuel burning apparatus comprising means forming a combustion chamber having a substantially cylindrical wall, a first end plate closing one end of said chamber, an imperforate second end plate closing the other end of said chamber, said second end plate having an inwardly convex central portion, a substantially flat thin ceramic wick in surface contact with the inner surface of the central portion of said second end plate, a fluid fuel inlet communicating with said central portion of said second end plate, a foraminous metallic retainer for said wick, a spark plug having an electrode terminating at a point closely adjacent said retainer to form a spark gap therewith, an annular combustion chamber housing member surrounding a portion of said combustion chamber adjacent said second end plate, means for moving air in a helical path in the space between said combustion chamber and said combustion chamber housing member, means forming air inlet openings in the wall of said combustion chamber through which combustion air is supplied from said space, certain of said openings being disposed closely adjacent said second end plate, the remainder of said openings being disposed more remote from said second end plate, the latter openings having a substantially greater aggregate area than the openings adjacent said second end plate, and the combustion air flowing inwardly through said openings in a helical path through said combustion chamber, and passage means leading through said cylindrical wall to permit the passage of combustion products to the exterior of said combustion chamber.

3. The apparatus according to claim 2 together with a casing surrounding said combustion chamber and said combustion chamber housing member and a blower positioned in said casing for moving fresh air over the outer surface of said combustion chamber housing member and said combustion chamber.

(References on following page)

References Cited in the file of this patent

UNITED STATES PATENTS

| | | |
|---|---|---|
| 909,672 | Richardson | Jan. 12, 1909 |
| 918,812 | Anthony | Apr. 20, 1909 |
| 980,801 | Kraus | Jan. 3, 1911 |
| 1,399,939 | Doble | Dec. 13, 1921 |
| 1,408,277 | Ensign | Feb. 28, 1922 |
| 2,094,069 | Hill | Sept. 28, 1937 |
| 2,386,746 | Hess | Oct. 9, 1945 |
| 2,431,456 | Bock | Nov. 25, 1947 |
| 2,712,352 | Manor et al. | July 5, 1955 |
| 2,775,293 | Raymond et al. | Dec. 25, 1956 |
| 2,779,398 | Brown | Jan. 29, 1957 |
| 2,788,171 | Kulow | Apr. 9, 1957 |
| 2,822,037 | McCutcheon | Feb. 4, 1958 |
| 2,879,837 | Downs | Mar. 31, 1959 |
| 2,966,944 | Downs | Jan. 3, 1961 |
| 2,966,945 | Downs | Jan. 3, 1961 |